United States Patent
Holloway et al.

(10) Patent No.: US 6,636,855 B2
(45) Date of Patent: Oct. 21, 2003

(54) METHOD, SYSTEM, AND PROGRAM FOR ACCESSING STORED PROCEDURES IN A MESSAGE BROKER

(75) Inventors: Timothy Nicholas Holloway, Lyndhurst (GB); Constance Jane Nelin, Monte Sereno, CA (US); Marc-Thomas Schmidt, Winchester (GB); Stephen James Todd, Winchester (GB); Charles Daniel Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 09/802,409

(22) Filed: Mar. 9, 2001

(65) Prior Publication Data

US 2002/0129023 A1 Sep. 12, 2002

(51) Int. Cl.[7] ............................................. G06F 17/30
(52) U.S. Cl. .......................................... 707/10; 709/206
(58) Field of Search ..................... 707/2, 3, 10, 100, 707/102; 709/203, 205, 201, 216, 225, 228, 229, 206

(56) References Cited

U.S. PATENT DOCUMENTS

| | | | | | |
|---|---|---|---|---|---|
| 5,737,592 | A | * | 4/1998 | Nguyen et al. | 395/604 |
| 5,768,589 | A | * | 6/1998 | Bradley et al. | 395/684 |
| 5,778,228 | A | * | 7/1998 | Wei | 395/684 |
| 5,892,916 | A | * | 4/1999 | Gehlhaar et al. | 395/200.53 |
| 6,041,327 | A | * | 3/2000 | Glitho et al. | 707/10 |
| 6,317,750 | B1 | * | 11/2001 | Tortolani et al. | 707/103 |
| 6,407,753 | B1 | * | 6/2002 | Budinsky et al. | 345/764 |
| 6,493,714 | B1 | * | 12/2002 | Beaven et al. | 707/10 |
| 6,516,321 | B1 | * | 2/2003 | De La Huerga | 707/102 |

OTHER PUBLICATIONS

Oracle, Corp. "Oracle Message Broker 1.0" online, Oct. 1999, pp. 1–4, (Retrieved on Feb. 24, 2001). Retrieved from the Internet at URL: <http://www.oracle.com>.*

IBM, Corp. "Message Brokering: Should You Bet Your Business on It?" online from IBM MQSeries Library Articles, date unknown, pp. 1–4. (Retrieved on Feb. 12, 2001). Retrieved from the Internet at URL: <http://www.IBM.com>.*

IBM, Corp. "MQSeries Integrator: A Technical Overview" online from IBM MQSeries Library White Papers, date unknown, pp.1–8. (Retrieved on Feb. 25, 2001). Retrieved from the Internet at URL: <http://www.IBM.com>.*

IBM, Corp. "Formatter for MQSeries Integrator: Managing and Integrating Data Across the Enterprise" online from IBM MQSeries Library White Papers, date unknown, pp. 1–5. (Retrieved on Feb. 25, 2001). Retrieved from the Internet at URL: <http://IBM.com>.*

IBM, Corp. "IBM MQSeries Integrator V2.0 The Next Generation Message Broker" online MQSeries Library White Papers, date unknown, pp. 1–7, (Retrieved on Feb. 12, 2001). Retrieved from the Internet at URL: <http:www.IBM.com>.*

IBM, Corp. "Introduction and Planning" Version 2.0 from MQSeries Integrator, IBM Document No. GC34–5599–00, Apr. 2000, pp. iii–175.*

* cited by examiner

Primary Examiner—Safet Metjahic
Assistant Examiner—Etienne P LeRoux
(74) Attorney, Agent, or Firm—David W. Victor; Konrad, Raynes, Victor & Mann LLP

(57) ABSTRACT

Provided is a method, system, and program for processing a data flow. A message is received at an input node. The message is transferred to a plurality of nodes according to a defined data flow. At one stored procedure node, the message is processed to generate input parameters for a stored procedure call. The stored procedure node transfers the stored procedure call to a stored procedure at a server computer, wherein the server executes the stored procedure to process data and generate output.

51 Claims, 6 Drawing Sheets

METHOD, SYSTEM, AND PROGRAM FOR ACCESSING STORED PROCEDURES IN A MESSAGE BROKER

BACKGROUND OF THE INVENTION

1. Field of the Invention

The present invention relates to a method, system, and program for accessing stored procedures in a message broker.

2. Description of the Related Art

The International Business Machines Corporation ("IBM") MQ Series Integrator provides a messaging architecture to allow bi-directional data communication between message broker applications. Message brokers enable communication between businesses and between a business and consumers. A data flow defines connected nodes, where each node defines an operation to occur with respect to the message. Nodes typically process a single message at a time and feed single messages to downstream nodes. At the node, the content of the messages may be processed, transformed, and a new message generated to route to another node or location including the transformed data.

A data flow represents the sequence of operations performed on a message on the basis of rules that operate on the message's format and content. Data flows are comprised of processing nodes and connectors. Processing nodes, which function as processing units, define procedures that perform a specific action on a message, and output zero or more messages as a result of that action. Connectors join the output points of one processing node to the input point of the next node in the data flow. During message construction, processing nodes receive messages from an input queue, perform the process specified for the processing node, and then place the transformed message on an output queue for a target recipient node. There are two basic types of processing nodes, endpoint nodes and compute nodes. End point nodes define end-points in the data flow to/from clients that may send/receive messages. Compute nodes perform the intermediate processing on the message, including reformatting, transforming, removing data, routing, archiving. Further, the node may merge information from a database into the message content or add data from the message to a database.

Notwithstanding the above capabilities of current message broker systems to interact with other applications, such as database applications, when processing a message, there is a need in the art to provide techniques to improve the manner in which the processing node interfaces with more complex applications, such as database applications.

SUMMARY OF THE PREFERRED EMBODIMENTS

Provided is a method, system, and program for processing a data flow. A message is received at an input node. The message is transferred to a plurality of nodes according to a defined data flow. At one stored procedure node, the message is processed to generate input parameters for a stored procedure call. The stored procedure node transfers the stored procedure call to a stored procedure at a server computer, wherein the server executes the stored procedure to process data and generate output.

Further, the stored procedure output is capable of comprising one or more result sets of data from the database table and/or one or more output parameters resulting from stored procedure operations performed on data in the database table.

Additionally, an output mapping is processed indicating how result set data is mapped to locations in the message.

Still further, the output mapping indicates a result set to element correspondence, wherein adding the data in the received result sets comprises adding the result set data to at least one element in the message.

In certain implementations, the message is in the Extensible Markup Language (XML) format, and the elements comprise XML tagged elements.

In additional implementations, a receiving node in the data flow receives output generated by a stored procedure program executing on a server after the stored procedure program completes execution. The receiving node adds data from the stored procedure output to at least one output message. The receiving node processes the output message according to the data flow.

The described implementations provide a technique to enable a node in a data flow to access stored procedure programs at a server and control the mapping of data in returned result sets to the message. Such implementations allow data flows to utilize the benefits of stored procedure programs and allow processing nodes in data flows to utilize the stored procedures that are available at database servers.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
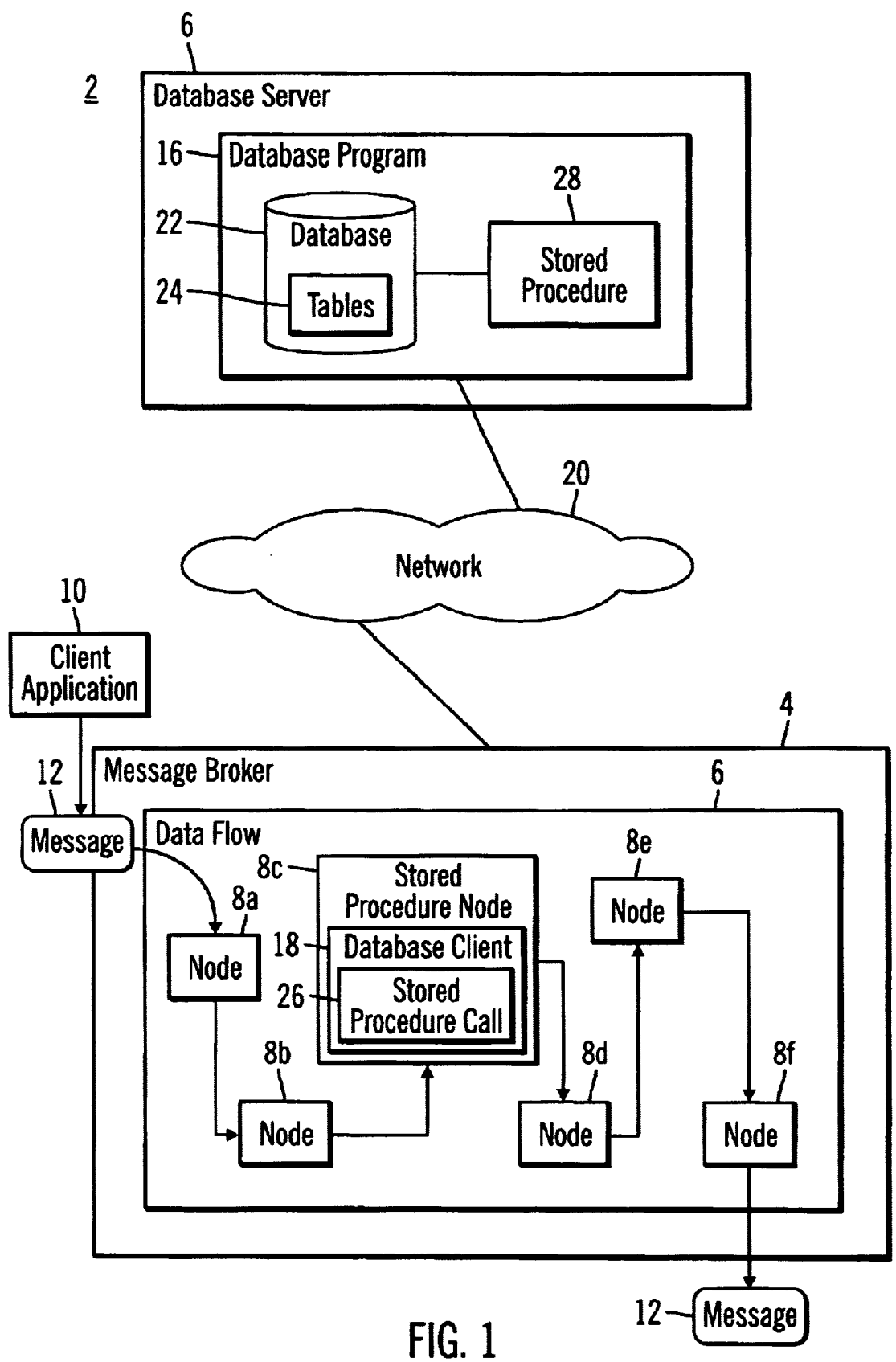
FIG. 1 illustrates a computing environment in which aspects of the invention are implemented.

FIG. 1 illustrates a network computing environment 2 implementing aspects of the invention. The network environment 2 includes a message broker 4 and a database server 6. A data flow 6 comprising interlinked processing nodes may be implemented on a single computer implementing a message broker 4. Additionally, the data flow 6 nodes may span multiple message broker systems. The message broker 4 is implemented on one system and provides middleware to allow intercommunication among application programs. The message broker 4 may be implemented as part of any enterprise application integration program known in the art, such as the IBM MQSeries Integrator, Oracle Message Broker, etc. In the implementation of FIG. 1, the message broker 4 includes a defined data flow 6 having processing nodes 8a, b, c, d, e, f. A client application 10, which may be implemented on a separate computer or one of the computers on which the message broker 4 middleware runs, generates a message 12. The message 12 may comprise a customer order for a product, such as an Internet placed order, a business to business invoice order for a product or server, or any other message to be processed by the data flow 6.

Each processing node 8a, b, c, d, e, f defines a set of rules on how to process the message 12. Each node 8a, b, c, d, e, f may modify or transform the content of the message 12 and transmit the transformed message 12 to another application, which may be on another system, or transform the message 12 into an e-mail transmission.

The database server 6 includes a database program 16. The database server 6 may comprise one or more servers or any other computer devices known in the art. Stored procedure node 8c includes a database client program 18 to communicate with the database server program 16. The message broker 4 and database server 6 communicate over a network 20, which may comprise any network known in the art, including a Transmission Control Protocol/Internet Protocol (TCP/IP) network (e.g., an Intranet, the Internet), Local Area Network, WAN, Fibre Channel, Token Ring, etc. Alternatively, the network 20 may be comprised of multiple networks. Alternatively, the database program 16 and message broker 4 may be implemented on the same machine, thereby avoiding the need for a network communication protocol.

The database client/server programs 16, 18 may be comprised of any database client/server program known in the art, such as IBM DB2, Oracle Corporation's ORACLE 8, Microsoft SQL Server, ** etc. The database programs 16 and 18 are used to access and perform operations with respect to information maintained in one or more databases 22. The database(s) 22 would consist of one or more tables 24 having rows and columns of data. Further details of the architecture and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in its entirety.

In the described implementations of FIG. 1, the database program 16 includes a stored procedure 28 that is a program invoked by a call or invocation mechanism 26 within the database client 18 at the stored procedure node 8c. The client call 26 provides input parameters to the stored procedure 28. In response to the call 26, the stored procedure 28 executes within the database server 6 and may processes numerous database 22 records according to the input parameters or perform a non-SQL related action. In certain stored procedure implementations, the client cannot client cannot interrupt the stored procedure 28 during execution. The stored procedure 28 may comprise a block of procedural constructs and may include Structured Query Language (SQL) statements, i.e., an application program. Additionally, the stored procedure 28 can execute program statements without querying the database tables 22. The stored procedure 28 can be invoked by name from the stored procedure node 8c. Stored procedures are particularly useful for processing a large number of database records, e.g., millions to billions of records, without having to transfer data between the server 6 and client, e.g., stored procedure node 8c. Stored procedures are maintained at the database server for access and reuse by multiple database clients. Further details of stored procedures are described in the publication "A Complete Guide to DB2 Universal Database," "A Complete Guide to DB2 Universal Database," which was incorporated by reference above.

In the described implementations, the client stored procedure 26 generates a CALL statement specifying the name of the server stored procedure 28 and the parameters received as input by the server stored procedure 28. To accomplish this, the stored procedure node 8c must include code to map any content of the message 12 received from node 8b to the input parameters of the CALL to the server stored procedure 28. Further, the node 8b must further include rules on how to supplement the message 12 with any data sets or output parameters returned from the stored procedure 28. The stored procedure 28 could return zero or more result sets of data from the tables 24 that satisfies a query. The query terms may be based on input parameters mapped from the message 12 and supplied by the client call 26. Additionally, the stored procedure 28 can perform calculations and operations on data in the database tables 24 or other operations that do not access the database tables 24 to generate one or more output parameters, such as an average of the value of all rows that satisfy a query condition, etc. Yet further, the stored procedure 28 can perform various actions on the database server 26 without returning any data to the node, such as send messages to yet further nodes. The node 8b must include code to map the one or more result sets and/or output parameters returned from the stored procedure 28 to the message 12.

Figure 2:
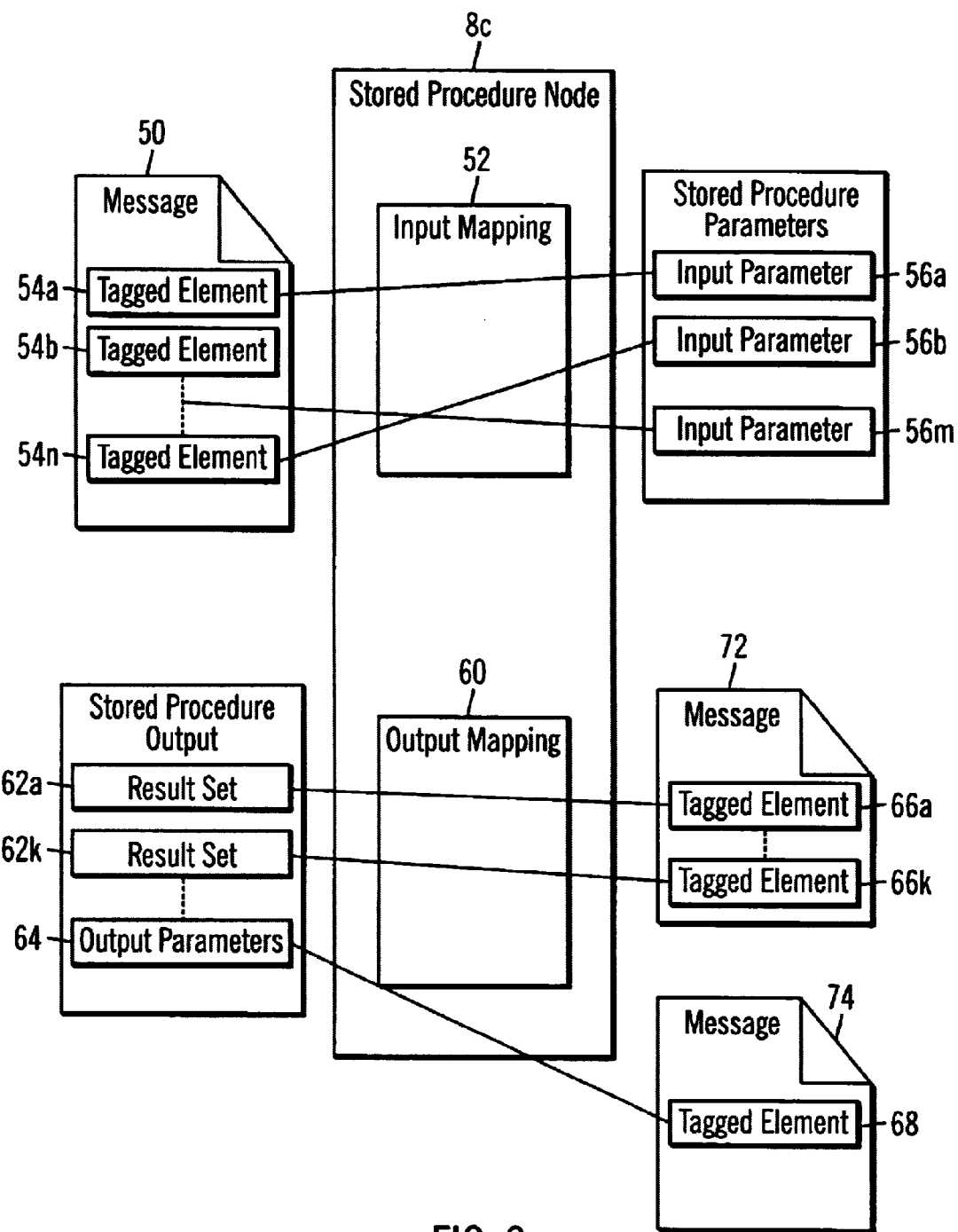
FIG. 2 illustrates data structures used by a stored procedure node in the data flow to call a stored procedure in accordance with described implementations of the invention.

FIG. 2 illustrates data structures maintained at the stored procedure node 8c used when invoking the call 26 to the stored procedure 28 and when inserting data from any returned result sets and/or parameters to the message 12. FIG. 2 further illustrates a message 50 received by the store procedure node 8c that includes self defined tagged elements 54a, b . . . n, such as the self defined tags used in an Extensible Markup Language (XML) document. The store procedure node 8c defines one or more input mappings 52 that define how the data in the tagged elements 54a, b . . . n of the message 12 map to the input parameters 56a, b . . . m of the stored procedure call 26 that are provided to the stored procedure 28. Additionally, if the stored procedure node 8c receives multiple messages, it may map tagged element data from multiple received messages to the stored procedure input parameters.

The stored procedure node 8c further includes one or more output mappings 60 that define how result sets 62a . . . k and output parameter(s) 64 returned by the stored procedure 28 map to tagged elements 66a . . . k and 68 within messages 72 and 74, respectively. Thus, the result sets and/or output parameters returned by the stored procedure 28 may map to tagged elements in one or more output messages from the stored procedure stored procedure node 8c. The input 52 and output 60 mappings may comprise an index defining how the content of tagged elements 54a, b . . . n map to input parameters 56a, b . . . m of the stored procedure call and how the returned result sets 62a . . . k and output parameters 64 from the stored procedure 28 map to tagged elements in one or more messages. The output mapping 60 may provide further levels of mappings, such as mapping metadata of each result set to a result set tag, then mapping each returned row of each result set to a tagged element that is a child of the result set tagged element and mapping each returned column in each row of the result set to a column tagged element that is a child of the row tagged element.

In certain implementations, the stored procedure 28 may not transfer output to the stored procedure node 8c and may instead transfer output to other nodes, which may or may not be stored procedure nodes. In such case, the stored procedure node 8c invoking the stored procedure 28 would not include the output mapping 6, which would instead be maintained by the one or more nodes receiving the stored procedure 28 output.

Further, if the stored procedure node 8c is capable of processing XML messages with different tagged element formats, then the stored procedure interface program 50 may maintain a different input 52 and output 60 mapping for each different message format to allow for processing of that message format. Alternatively, if the stored procedure node 8c would only receive a message 12 having one tagged element format, than only one set of input 52 and output 60 mappings are needed for the stored procedure interface program 50 for that stored procedure node 8c. Still further, different nodes calling stored procedures may utilize different input 52 and output 60 mappings to use different elements of the message as input parameters to different stored procedure programs.

Figure 3:
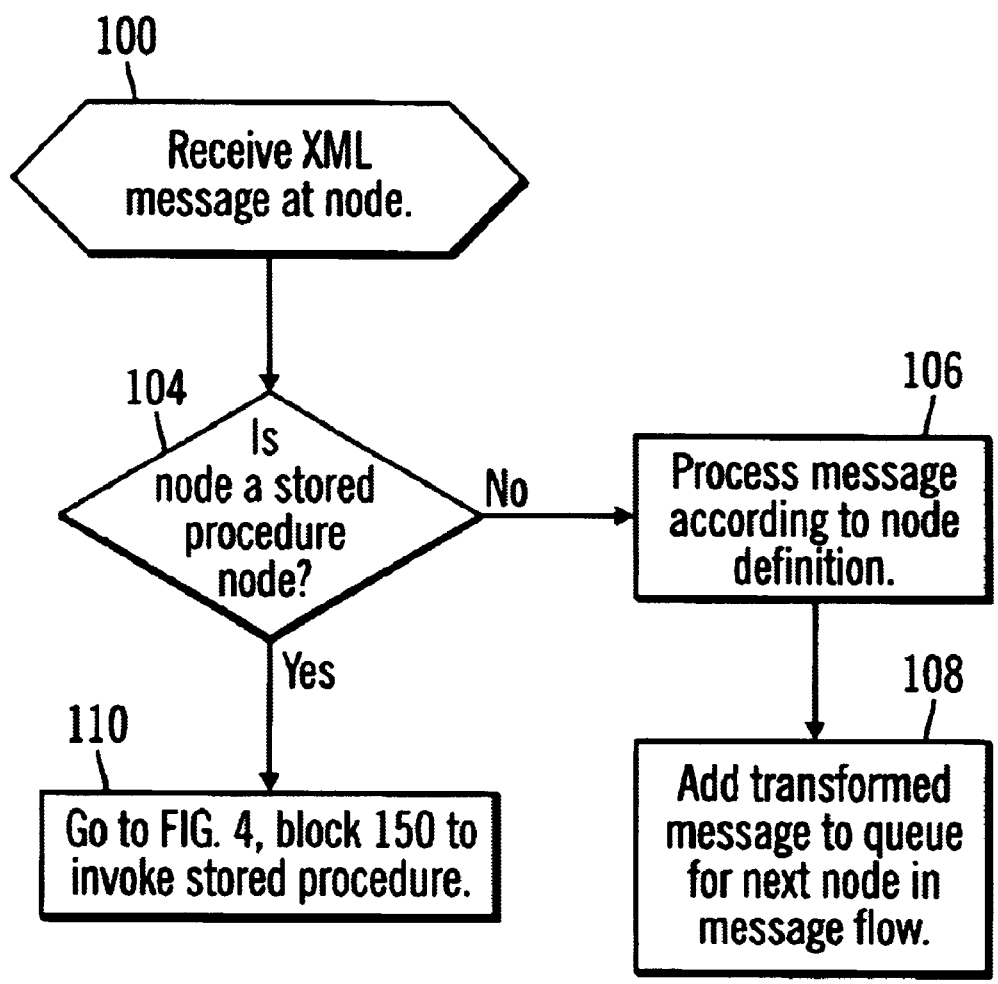
FIG. 3 illustrates logic executed in nodes in the data flow to process messages in accordance with described implementations of the invention.

FIG. 3 illustrates logic implemented at node a node 8a, b, c, d, e, f to process the message outputted from another node, or received from the client application 10. Control begins at block 100 with an XML message 12 being received at a node 8a, b, c, d, e, f. If (at block 104) the receiving node is not a stored procedure node, then the message is processed (at block 106) according to the node definitions in a manner known in the art. The processed message, which may have been transformed or otherwise processed in a manner known in the art, is then added (at block 108) to the queue of the next node in the data flow 6. If the receiving node is a stored procedure node, such as stored procedure node 8c, then control proceeds to block 150 in FIG. 4 to invoke the stored procedure 28.

Figure 4:
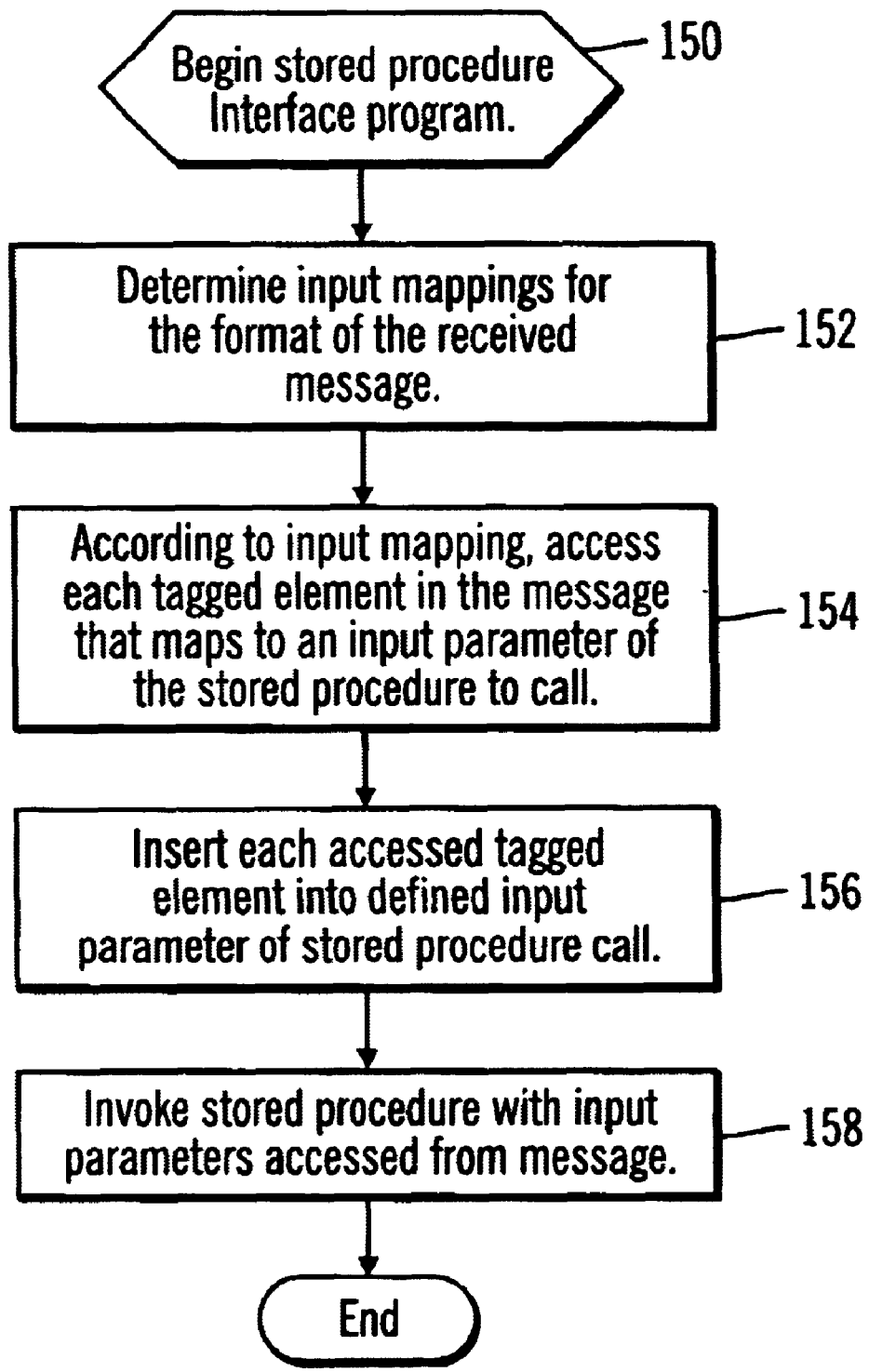
FIG. 4 illustrates logic execute at a stored procedure node to call a stored procedure in accordance with described implementations of the invention.

FIG. 4 illustrates the logic implemented in the stored procedure node 8c, beginning at block 150, to handle stored procedure calls and data in the data flow. The stored procedure node 8c determines (at block 152) the input 52 mapping(s) for the particular message involved in the stored procedure call. If the data flow 6 is capable of handling different types of messages having different formats, then the stored procedure node 8c may maintain a different set of input 52 and output 60 mappings for each different type of message format handled at the node. The stored procedure node 8c then uses (at block 154) the determined input mappings 52 to access the tagged elements in the message 12 that map to input parameters of the stored procedure call 26. The content within the tagged elements is then inserted (at block 156) into the input parameters of the stored procedure CALL. The format of the data accessed from the elements in the message 12 may be transformed or converted to another format before being used as input parameters 56a, b . . . m. The client invocation mechanism 26 is then used to call (at block 158) the stored procedure 28 with the input parameters accessed from the message 12.

Figure 5:
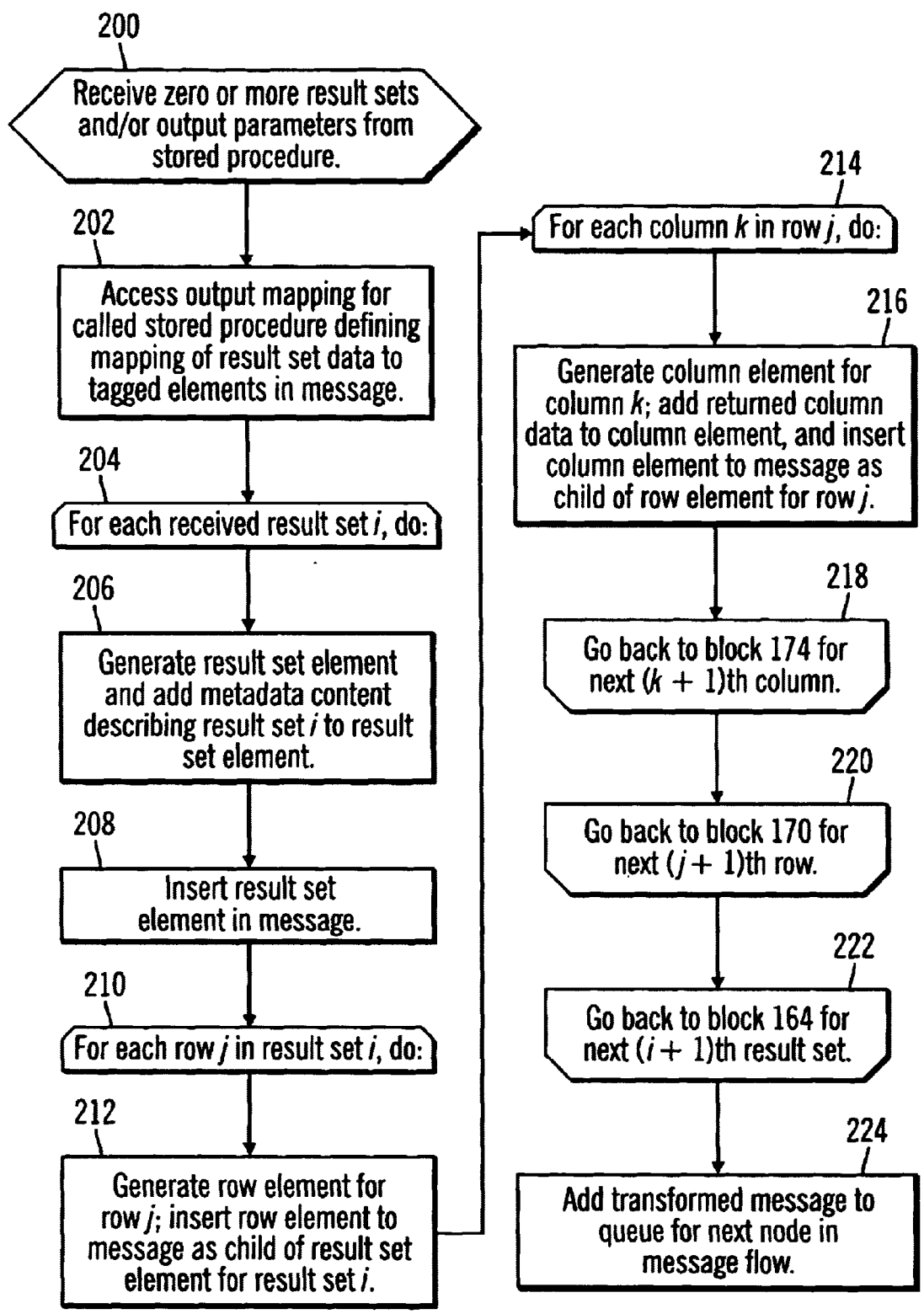
FIG. 5 illustrates logic executed at a node to process received stored procedure output in accordance with described implementations of the invention.

FIG. 5 illustrates logic implemented in a node receiving the output generated by the stored procedure 28, which may comprise the stored procedure node 8c that invoked the stored procedure 28 or some other node in the data flow 6. Upon receiving (at block 200) zero or more result sets of rows and/or output parameters generated by the stored procedure 28, the receiving node accesses (at block 202) the output mapping 60 for the called stored procedure 28, which defines a mapping of result set data to the message 12. Because the implementation described with respect to FIG. 5 involves a message in the XML format, the returned result set data and/or output parameters would be added to tagged elements in the XML message 12. The output parameters may be fixed predefined numbers and fields, such as a calculated values, whereas the number of result sets returned may vary. At blocks 204 to 222, the receiving node performs steps 206 through 220 for each received result set i. For each result set i, a result set element is generated (at block 206) and metadata describing result set i is added as content to the result set element. The result set element is then inserted into the message (at block 208) For each row j in result set i (at blocks 210–220), the receiving node generates (at block 212) a row element and inserts the row element for row j into the message as a child of the result set element for result set i. For each column k in row j (at blocks 214–218), the stored procedure node 8c generates (at block 216) a column element for column k and adds the returned column data to the column element. The column element is then inserted into the message 12 as a child of row element j. The output parameters, which likely comprise fixed values, may be inserted at specific tagged elements in the message. After adding the data from the returned result sets and/or output parameters to the message 12, the transformed message 12, shown as 72 and 74 in FIG. 2, is then added (at block 224) to the queue for the next node in the data flow 6.

In additional implementations, all the column elements may not be used, and all the data for a row would be added to the row element. Still further, row and column elements may not be used and all the data for each row can be added to the result set element.

Figure 6:
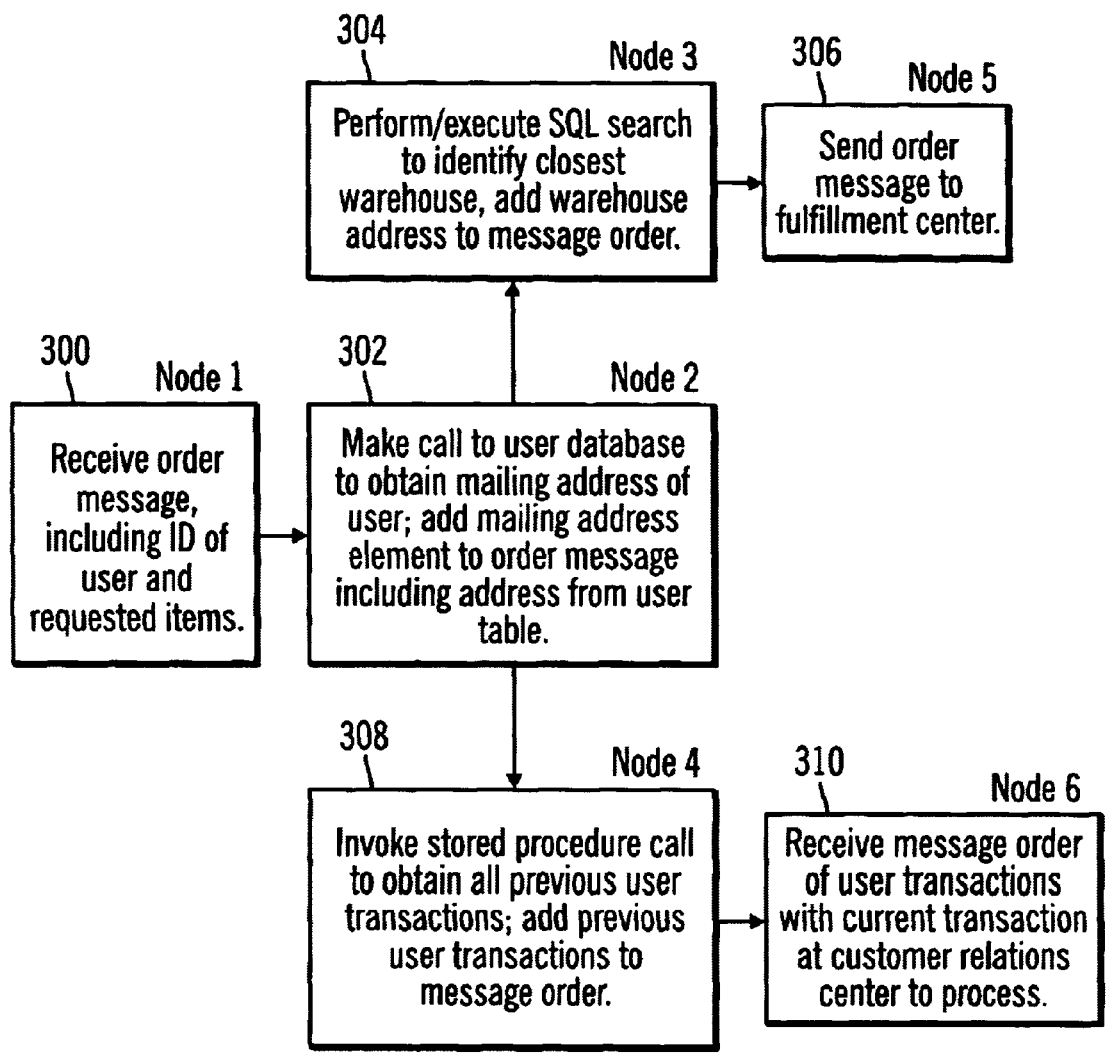
FIG. 6 provides an example of an e-commerce implementation in accordance with described implementations of the invention.

FIG. 6 illustrates an example of how the above described logic could be utilized in an electronic commerce (e-commerce) data flow. At node 1 at block 300, the data flow receives a order message, including an identification (ID) of the user initiating the order and the items and quantity ordered. The message is then sent to node 2 at block 302 where a user database is called to obtain the mailing address associated with the user ID in the message order. This mailing address is then added to the order message. From node 2 at block 302 the order message is concurrently sent to nodes 3 and 4. At block 304, node 3 executes queries on one or more warehouse databases to determine the closest warehouse including the number of requested items. Information on the closest warehouse that can ship to the user mailing address is added to the order message and send to node 5 at block 306, where the order message is sent to a fulfillment center to complete. At node 4 at block 308, a stored procedure call is invoked including as a parameter the user ID to issue an SQL query against one or more databases to locate all transactions from the user initiating the order message. The server stored procedure would then return all the transactions, which could be numerous, back to the node 4 to add to the order message. The order message is then routed to node 7 at block 310, which comprises a customer relations processor to analyze and process historical transaction information on the user that submitted the recent order message.

The stored procedure nodes could be used for numerous other e-commerce uses, such as query the database and gather record from which shipping costs can be calculated, inventory reviewed, shipments processed, trend analysis returned, etc. The processing burdens are transferred from the node to the database server.

With the logic and data structures described with respect to FIGS. 2–5, the described implementations provide a technique for adding data to a message capable of including self-defining tagged elements, such as an XML document, during a data flow when the number of data records returned from the stored procedure can vary. Any nodes or applications subsequently processing this message can readily access the result set, even if variable, because the content of the result set is maintained in tagged elements. The application or node processing the message would include the capability to process tagged elements whose number may vary depending on the number of records in the database.

With the above described implementations, a data flow may execute a stored procedure, which allows all the database processing or other processing to occur at the database server so as to minimize the impact on network traffic 20 and conserve computing consumed by the message broker 4. Moreover, the stored procedures in the database server may be reused and shared by nodes in the same or different data flows.

Further, the above described implementations provide a technique to make stored procedure programs already available at a server 6 to nodes in a data flow.

Following are some alternative implementations.

The preferred embodiments may be implemented as a method, apparatus or article of manufacture using standard programming and/or engineering techniques to produce software, firmware, hardware, or any combination thereof The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Preferred embodiments were described with respect to specific data structures, such as input and output mappings, for generating and transferring calls to a stored procedure program. However, those skilled in the art will recognize that modifications may be made to the manner in which the node maps data from the order message to input parameters of the stored procedure and how the node maps the result set data to the order message and such modification would still remain within the scope of the present invention.

In the described implementations, the message was implemented in a document including self-defining tags, such as an XML document. Additionally, the message may be in alternative document formats, HTML, Rich Text Format (RTF), a word processor document format, spreadsheet format, Dynamic Hypertext Mark-Up Language (DHTML), Cascading Style Sheets, any other Standard Generalized Markup Language (SGML), or any other language known in the art for creating interchangeable, structured documents. In such case, the stored procedure interface program would include the capability to add result sets of varying size to the message in a format accessible to applications at subsequent nodes.

In non-XML implementations, the elements mapping to input parameters and to which the result set data maps may comprise detectable fields in the message, wherein the different elements can be separated by delimiters, such as comma-delimited or by known offsets determined from the known field lengths of the message. Thus, the term element as used herein can describe any delimited or field in a message that can be accessed and that includes a distinct data grouping, such as an entire result set, entire row of data or column of data.

In the described implementations, the stored procedure transmitted output to other nodes in the data flow. Additionally, the stored procedure may not transfer output to other nodes, but may transmit output to other applications or perform some other actions, such as updating the database, sending an e-mail, etc.

In the described implementations, the stored procedure processed data in the database to generate result sets and/or output parameters. Additionally, the stored procedure may generate result sets and/or parameters without accessing the database.

In the above described implementations, the node called the stored procedure to return result sets. Additionally, a node may call a stored procedure and pass data to a stored procedure to apply to databases.

The example implementation of FIG. 2 illustrated one node including a stored procedure. Additionally, multiple nodes may call the same or different stored procedures in the same or different databases. Still further, one node may call multiple stored procedures. Each called stored procedure may perform SQL operations.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing a data flow, wherein the data flow defines connected nodes, and wherein each node defines an operation to perform with respect to a message, comprising:

receiving the message at an input node;

transferring the message to a plurality of nodes according to a defined data flow;

processing the message, at a stored procedure node, to generate input parameters for a stored procedure call; and transferring, with the stored procedure node, the stored procedure call with the input parameters to the stored procedure at a database server executing in a computer, wherein the database server executes the stored procedure to generate stored procedure output.

2. The method of claim 1, wherein the stored procedure processes a database and generates the output by performing operations on data in the database, wherein the output is capable of comprising output that is a member of the set of output comprising one or more result sets of data from the database table and one or more output parameters resulting from stored procedure operations performed on data in the database table.

3. The method of claim 1, further comprising processing, with the stored procedure node, an input mapping to determine the data in the message to use as at least one input parameter to the stored procedure call.

4. The method of claim 1, further comprising:
receiving the stored procedure output after the stored procedure program completes execution;
adding data from the stored procedure output to at least one output message; and.
further processing the output message according to the data flow.

5. The method of claim 1, further comprising processing an output mapping indicating how the output is mapped to locations in the message.

6. The method of claim 5, wherein the output is capable of including result sets and parameters, wherein the output mapping indicates a result set or parameter to element correspondence, wherein adding the data in the received result sets or parameters comprises adding the result set or parameter data to at least one element in the at least one message.

7. The method of claim 6, further comprising:
generating metadata describing each received result set; and
for each received result set in the output, adding the metadata to the element corresponding to the result set in the message.

8. The method of claim 6, wherein the result sets in the output comprise multiple rows of columns of data, wherein the output mapping indicates a row element to row correspondence, wherein adding the data in the received result set to the at least one message further comprises adding the data for each row in each result set received from the stored procedure to one row element in the at least one message.

9. The method of claim 6, wherein the output mapping indicates a column element to column correspondence, wherein adding the data in the received result set to the message further comprises adding the data for each column in each row in each result set received from the stored procedure to one column element.

10. The method of claim 6, wherein the output mapping indicates a result set to result set correspondence, a row to row element correspondence, and a column to column element correspondence, wherein adding the data in each received result set to the message further comprises:
adding metadata describing the result set to the result set element;
adding one row element to the message for each row in the result set; and
for each row, adding one column element including column data from the row for each returned column in the rows of the result set.

11. The method of claim 10, wherein each row element from one result set is a child element of the result set element of the result set, and wherein each column element is a child element of the row element of the row including the column element data.

12. The method of claim 6, wherein the at least one message is in the Extensible Markup Language (XML) format, and wherein the elements comprise XML tagged elements.

13. The method of claim 1, wherein multiple nodes in the data flow are capable of calling one or more stored procedures in the server.

14. The method of claim 1, wherein the stored procedure is capable of transmitting output to multiple nodes in the data flow.

15. The method of claim 1, wherein the received message comprises a customer order for a product, and wherein the data flow processes the customer order through the nodes.

16. A method for processing a data flow, wherein the data flow defines connected nodes, and wherein each node defines an operation to perform with respect to a message, comprising:
receiving, at a receiving node in the data flow, output generated by a stored procedure program executing on a database server after the stored procedure program completes execution;
adding, with the receiving node, data from the stored procedure output to at least one output message; and.
further processing, with the receiving node, the output message according to the data flow to transmit the output message to another node in the data flow.

17. The method of claim 16, further comprising:
transferring, with a stored procedure node in the data flow, a stored procedure call with the input parameters to the stored procedure at the server, wherein the output generated by the stored procedure is sent to the receiving node.

18. A system for processing a data flow, wherein the data flow defines connected nodes, and wherein each node defines an operation to perform with respect to a message, comprising:
means for receiving the message at an input node;
means for transferring the message to a plurality of nodes according to a defined data flow;
means for processing the message to generate input parameters for a stored procedure call; and
means for transferring the stored procedure call with the input parameters to the stored procedure at a database server computer, wherein the database server executes the stored procedure to generate stored procedure output.

19. The system of claim 18, wherein the stored procedure processes a database and generates the output by performing operations on data in the database, wherein the output is capable of comprising output that is a member of the set of output comprising one or more result sets of data from the database table and one or more output parameters resulting from stored procedure operations performed on data in the database table.

20. The system of claim 18, further comprising means for processing an input mapping to determine the data in the message to use as at least one input parameter to the stored procedure call.

21. The system of claim 18, further comprising:
means for receiving the stored procedure output after the stored procedure program completes execution;
means for adding data from the stored procedure output to at least one output message; and
means for further processing the output message according to the data flow.

22. The system of claim 18, further comprising means for processing an output mapping indicating how the output is mapped to locations in the message.

23. The system of claim 22, wherein the output is capable of including result sets and parameters, wherein the output mapping indicates a result set or parameter to element correspondence, wherein the means for adding the data in the received result sets or parameters performs adding the result set or parameter data to at least one element in the at least one message.

24. The system of claim 22, further comprising:
means for generating metadata describing each received result set; and
means for adding, for each received result set in the output, the metadata to the element corresponding to the result set in the message.

25. The system of claim 23, wherein the result sets in the output comprise multiple rows of columns of data, wherein the output mapping indicates a row element to row correspondence, wherein the means for adding the data in the received result set to the at least one message performs adding the data for each row in each result set received from the stored procedure to one row element in the at least one message.

26. The system of claim 23, wherein the output mapping indicates a column element to column correspondence, wherein the means for adding the data in the received result set to the message further performs adding the data for each column in each row in each result set received from the stored procedure to one column element.

27. The system of claim 23, wherein the output mapping indicates a result set to result set correspondence, a row to row element correspondence, and a column to column element correspondence, wherein the means for adding the data in each received result set to the message further performs:
adding metadata describing the result set to the result set element;
adding one row element to the message for each row in the result set; and
for each row, adding one column element including column data from the row for each returned column in the rows of the result set.

28. The system of claim 27, wherein each row element from one result set is a child element of the result set element of the result set, and wherein each column element is a child element of the row element of the row including the column element data.

29. The system of claim 23, wherein the at least one message is in the Extensible Markup Language (XML) format, and wherein the elements comprise XML tagged elements.

30. The system of claim 18, wherein multiple nodes in the data flow are capable of calling one or more stored procedures in the server.

31. The system of claim 18, wherein the stored procedure is capable of transmitting output to multiple nodes in the data flow.

32. The system of claim 18, wherein the received message comprises a customer order for a product, and wherein the data flow processes the customer order through the nodes.

33. A system for processing a data flow, wherein the data flow defines connected nodes, and wherein each node defines an operation to perform with respect to a message, comprising:
means for receiving output generated by a stored procedure program executing on a database server after the stored procedure program completes execution;
means for adding data from the stored procedure output to at least one output message; and.
means for further processing the output message according to the data flow to transmit the output message to another node in the data flow.

34. The system of claim 33, further comprising:
means for transferring a stored procedure call with the input parameters to the stored procedure at the server, wherein the stored procedure generates the output.

35. An article of manufacture implementing code for processing a data flow, wherein the data flow defines connected nodes, and wherein each node defines an operation to perform with respect to a message, by:
receiving the message at an input node;
transferring the message to a plurality of nodes according to a defined data flow;
processing the message, at a stored procedure node, to generate input parameters for a stored procedure call; and
transferring, with the stored procedure node, the stored procedure call with the input parameters to the stored procedure at a database server, wherein the database server executes the stored procedure to generate stored procedure output.

36. The article of manufacture of claim 35, wherein the stored procedure processes a database and generates the output by performing operations on data in the database, wherein the output is capable of comprising output that is a member of the set of output comprising one or more result sets of data from the database table and one or more output parameters resulting from stored procedure operations performed on data in the database table.

37. The article of manufacture of claim 35, further comprising processing, with the stored procedure node, an input mapping to determine the data in the message to use as at least one input parameter to the stored procedure call.

38. The article of manufacture of claim 35, further comprising:
receiving the stored procedure output after the stored procedure program completes execution;
adding data from the stored procedure output to at least one output message; and
further processing the output message according to the data flow.

39. The article of manufacture of claim 35, further comprising processing an output mapping indicating how the output is mapped to locations in the message.

40. The article of manufacture of claim 39, wherein the output is capable of including result sets and parameters, wherein the output mapping indicates a result set or parameter to element correspondence, wherein adding the data in the received result sets or parameters comprises adding the result set or parameter data to at least one element in the at least one message.

41. The article of manufacture of claim 40, further comprising:
generating metadata describing each received result set; and
for each received result set in the output, adding the metadata to the element corresponding to the result set in the message.

42. The article of manufacture of claim 40, wherein the result sets in the output comprise multiple rows of columns of data, wherein the output mapping indicates a row element to row correspondence, wherein adding the data in the received result set to the at least one message further comprises adding the data for each row in each result set received from the stored procedure to one row element in the at least one message.

43. The article of manufacture of claim 40, wherein the output mapping indicates a column element to column correspondence, wherein adding the data in the received result set to the message further comprises adding the data for each column in each row in each result set received from the stored procedure to one column element.

44. The article of manufacture of claim 40, wherein the output mapping indicates a result set to result set correspondence, a row to row element correspondence, and a column to column element correspondence, wherein adding the data in each received result set to the message further comprises:

adding metadata describing the result set to the result set element;

adding one row element to the message for each row in the result set; and for each row, adding one column element including column data from the row for each returned column in the rows of the result set.

45. The article of manufacture of claim 44, wherein each row element from one result set is a child element of the result set element of the result set, and wherein each column element is a child element of the row element of the row including the column element data.

46. The article of manufacture of claim 40, wherein the at least one message is in the Extensible Markup Language (XML) format, and wherein the elements comprise XML tagged elements.

47. The article of manufacture of claim 35, wherein multiple nodes in the data flow are capable of calling one or more stored procedures in the server.

48. The article of manufacture of claim 35, wherein the stored procedure is capable of transmitting output to multiple nodes in the data flow.

49. The article of manufacture of claim 35, wherein the received message comprises a customer order for a product, and wherein the data flow processes the customer order through the nodes.

50. An article of manufacture implementing code for processing a data flow, wherein the data flow defines connected nodes, and wherein each node defines an operation to perform with respect to a message, by:

receiving, at a receiving node in the data flow, output generated by a stored procedure program executing on a database server after the stored procedure program completes execution;

adding, with the receiving node, data from the stored procedure output to at least one output message; and.

further processing, with the receiving node, the output message according to the data flow to transmit the output message to another node in the data flow.

51. The article of manufacture of claim 50, further comprising:

transferring, with a stored procedure node in the data flow, a stored procedure call with the input parameters to the stored procedure at the server, wherein the output generated by the stored procedure is sent to the receiving node.

* * * * *